(12) United States Patent
Smith et al.

(10) Patent No.: US 12,338,592 B2
(45) Date of Patent: Jun. 24, 2025

(54) ANIMAL FECES COLLECTION ASSEMBLY

(71) Applicants: Matt Smith, Cumming, GA (US); Jake Smith, Cumming, GA (US)

(72) Inventors: Matt Smith, Cumming, GA (US); Jake Smith, Cumming, GA (US)

(*) Notice: Subject to any disclaimer, the term of this patent is extended or adjusted under 35 U.S.C. 154(b) by 438 days.

(21) Appl. No.: 17/968,333

(22) Filed: Oct. 18, 2022

(65) Prior Publication Data

US 2024/0125062 A1 Apr. 18, 2024

(51) Int. Cl.
*E01H 1/00* (2006.01)
*A01K 1/01* (2006.01)
*G05D 1/00* (2006.01)
*G05D 1/02* (2020.01)
*G06V 20/60* (2022.01)

(52) U.S. Cl.
CPC ............... *E01H 1/006* (2013.01); *A01K 1/01* (2013.01); *G05D 1/0276* (2013.01); *G06V 20/60* (2022.01)

(58) Field of Classification Search
CPC ........ E01H 1/006; A01K 1/01; G05D 1/0276; G06V 20/60
See application file for complete search history.

(56) References Cited

U.S. PATENT DOCUMENTS

| | | | |
|---|---|---|---|
| 4,185,355 A | 1/1980 | Williams | |
| 6,618,898 B2 * | 9/2003 | Tingle | A01K 1/01 15/352 |
| 8,601,637 B2 * | 12/2013 | Mainini | E01H 1/006 15/340.3 |
| 9,920,494 B2 | 3/2018 | Rivadeneira | |
| 10,049,278 B2 * | 8/2018 | Womble | E01H 1/006 |
| 10,294,619 B1 * | 5/2019 | Pallack | B08B 1/165 |
| 10,870,958 B2 * | 12/2020 | Fornarotto | G05D 1/0246 |
| 11,249,495 B2 * | 2/2022 | Womble | G05D 1/12 |
| 11,866,896 B2 * | 1/2024 | Patel | E01H 1/1206 |
| 11,933,005 B1 * | 3/2024 | Nichols | E01H 1/006 |
| 2008/0173247 A1 * | 7/2008 | Mainini | G05D 1/0246 901/1 |
| 2019/0271125 A1 * | 9/2019 | Fornarotto | G05D 1/0246 |
| 2020/0150696 A1 * | 5/2020 | Womble | G06K 7/10366 |

(Continued)

FOREIGN PATENT DOCUMENTS

| | | | | |
|---|---|---|---|---|
| CN | 108617516 A | * | 10/2018 | ............... A01K 1/01 |
| CN | 109526760 A | * | 3/2019 | |
| CN | 110036398 A | * | 7/2019 | |

(Continued)

*Primary Examiner* — Marc Carlson

(57) ABSTRACT

An animal feces collection assembly for automatically collecting animal feces in a yard includes a cart that has a drive unit integrated into the cart and a collection space is integrated into the cart. The cart has a ramp is positionable in an open position or closed position. A collection unit is movably integrated into the cart to engage animal feces that have been collected on the ramp. The collection unit is actuated into a retracted condition to urge the animal feces upwardly along the ramp and into the collection space. A camera is coupled to the cart thereby facilitating the camera to capture footage of the yard view the animal feces. The drive unit is actuated to drive the cart toward the animal feces and the collection unit is actuated into an extended condition when the cart approaches the animal feces to automatically collect the animal feces from the yard.

12 Claims, 10 Drawing Sheets

(56) References Cited

U.S. PATENT DOCUMENTS

| | | | | |
|---|---|---|---|---|
| 2021/0386260 | A1* | 12/2021 | Horn | A47L 11/00 |
| 2023/0323615 | A1* | 10/2023 | Ferkel | E01H 1/006 |
| | | | | 119/161 |

FOREIGN PATENT DOCUMENTS

| | | | | | |
|---|---|---|---|---|---|
| CN | 112470948 | A | * | 3/2021 | |
| CN | 113634173 | A | * | 11/2021 | |
| CN | 113678741 | A | * | 11/2021 | |
| CN | 114711151 | A | * | 7/2022 | |
| CN | 118668622 | A | * | 9/2024 | |
| DE | 202004017153 | U1 | * | 7/2005 | A01F 15/02 |

* cited by examiner

ANIMAL FECES COLLECTION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to feces collection devices and more particularly pertains to a new feces collection device for automatically collecting animal feces from a yard. The device includes a cart that has a drive unit for driving the card around a yard. The device includes a collection unit that collects the animal feces to store the animal feces in a collection space within the cart. The device includes a camera attached to the cart to viewing the yard and identifying the location of the animal feces in the yard thereby facilitating the cart to approach the animal feces and subsequently collect the animal feces.

(2) Description of Related Art Including Information Disclosed Under 37 CFR 1.97 and 1.98

The prior art relates to feces collection devices including a variety of feces collection devices each at least employs suction to suck feces into a collection bag. The prior art discloses a method and apparatus for treatment or collection of animal feces which includes an autonomous cart which detects animal feces and which dispenses a deodorant onto animal feces. The prior art discloses a remote animal care device that includes a robotic caregiver and a smart collar worn by a pet. The prior art discloses an automated feces collection device that includes an autonomous cart and a pair of grabbers that each extends downwardly from the autonomous cart to grab feces.

BRIEF SUMMARY OF THE INVENTION

An embodiment of the disclosure meets the needs presented above by generally comprising a cart that has a drive unit integrated into the cart and a collection space is integrated into the cart. The cart has a ramp is positionable in an open position or closed position. A collection unit is movably integrated into the cart to engage animal feces that have been collected on the ramp. The collection unit is actuated into a retracted condition to urge the animal feces upwardly along the ramp and into the collection space. A camera is coupled to the cart thereby facilitating the camera to capture footage of the yard view the animal feces. The drive unit is actuated to drive the cart toward the animal feces and the collection unit is actuated into an extended condition when the cart approaches the animal feces to automatically collect the animal feces from the yard.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
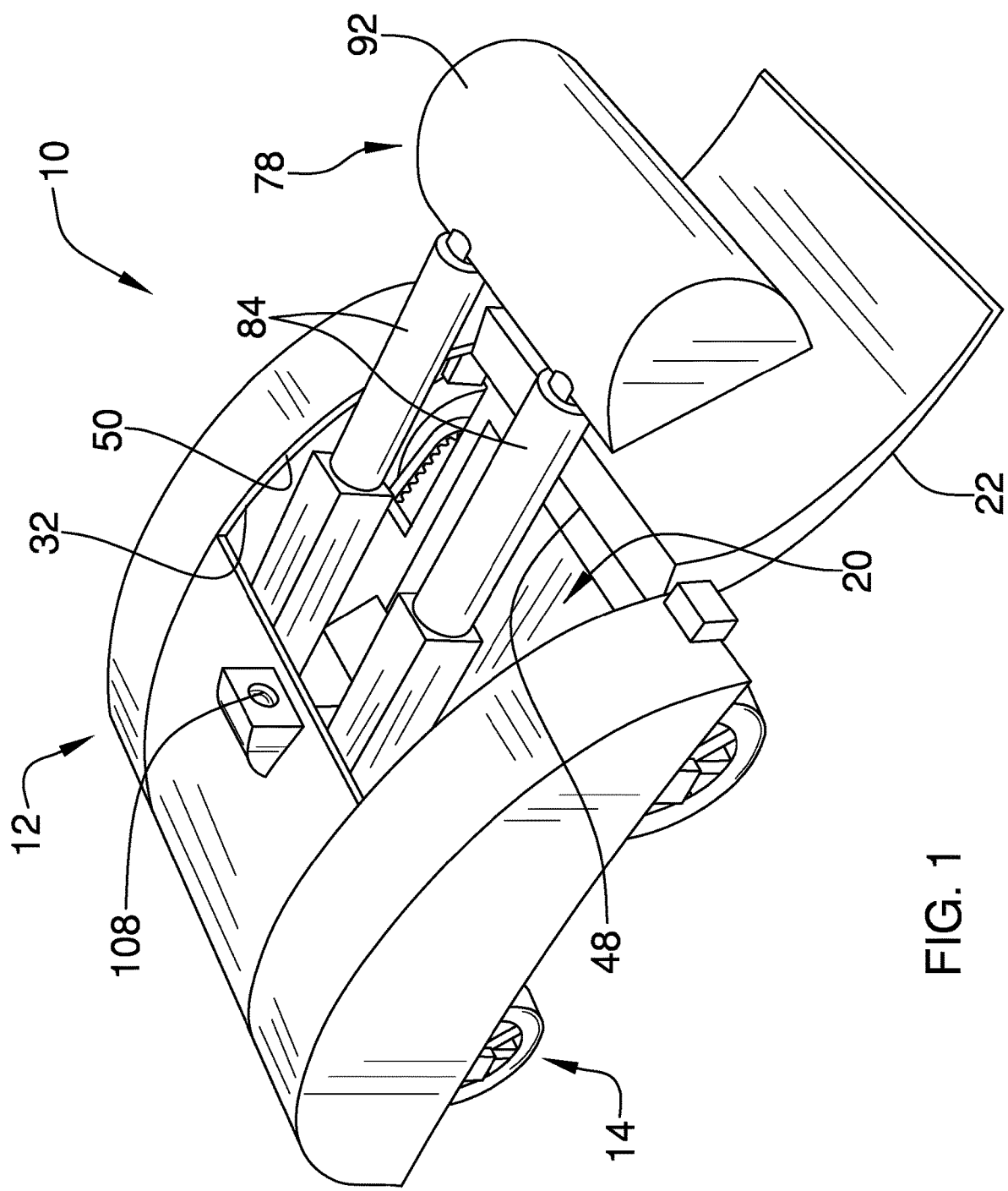
FIG. 1 is a top perspective view of an animal feces collection assembly according to an embodiment of the disclosure.
Figure 2:
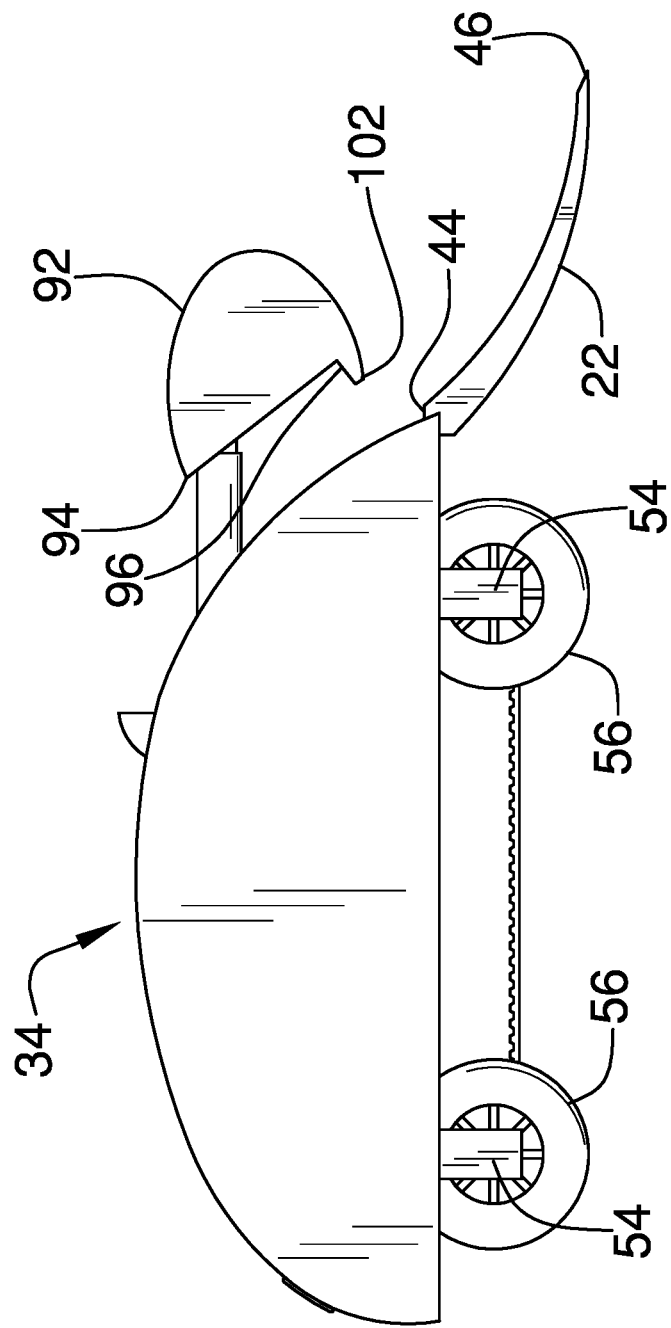
FIG. 2 is a right side view of an embodiment of the disclosure.
Figure 3:
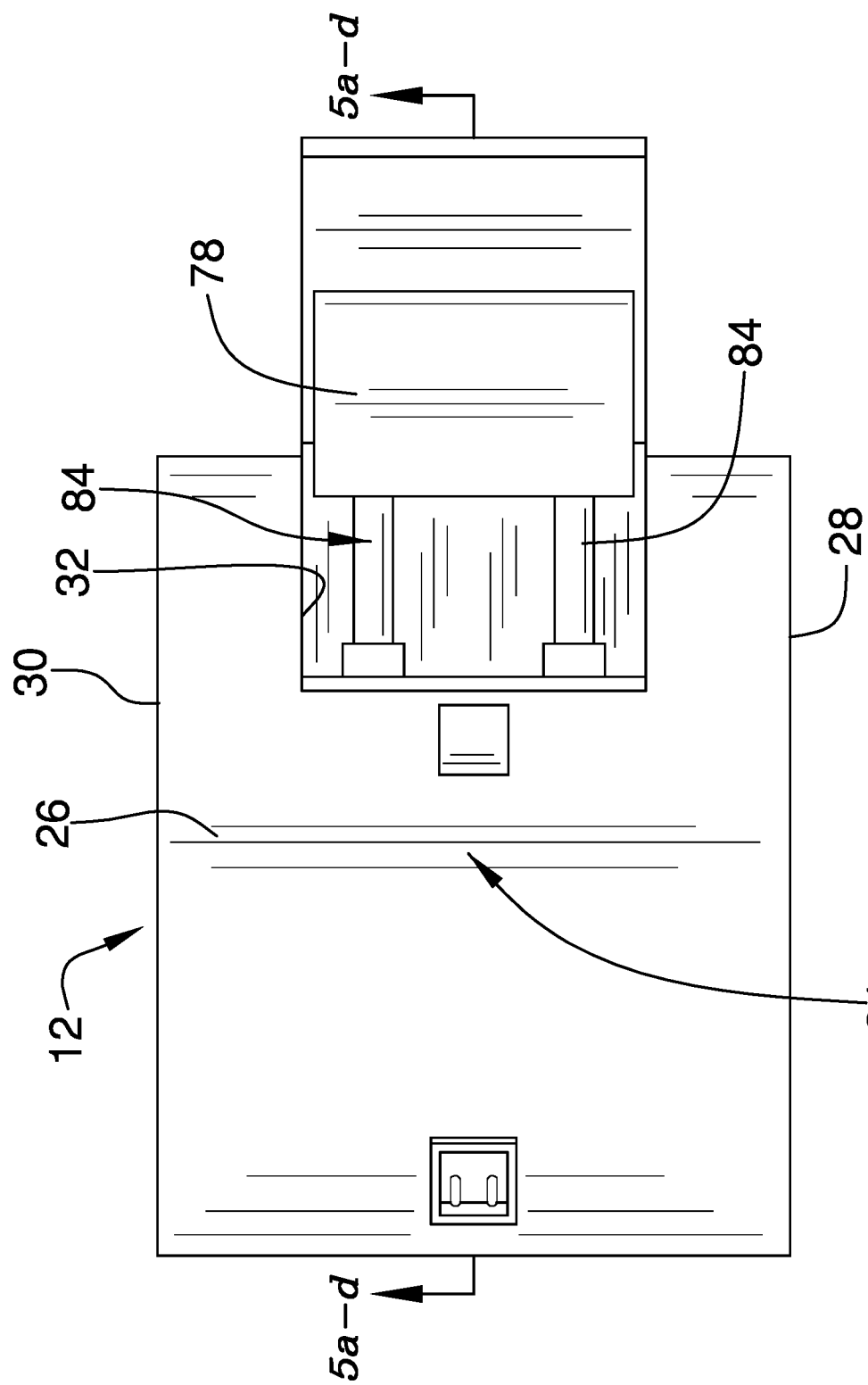
FIG. 3 is a top view of an embodiment of the disclosure.
Figure 4:
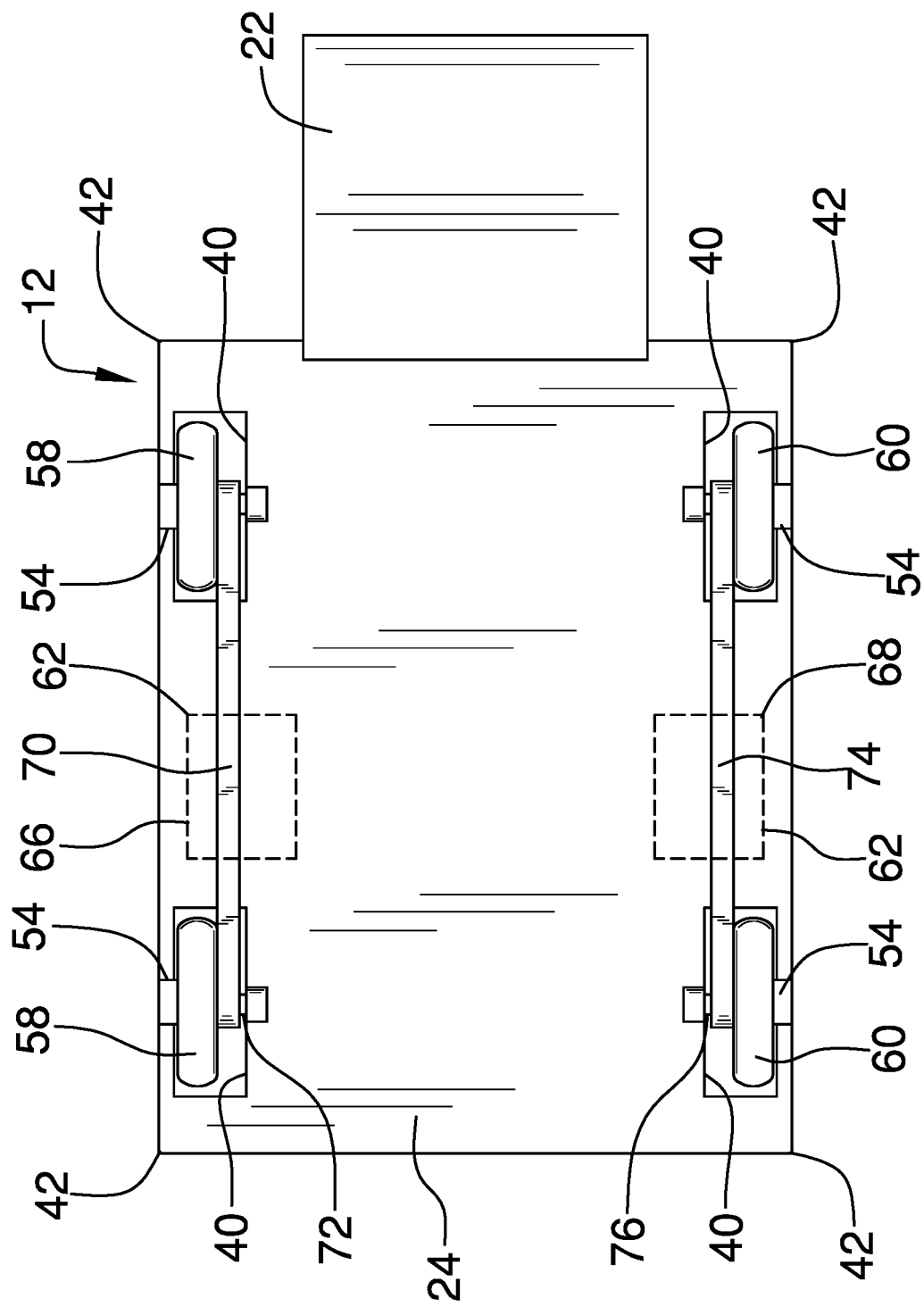
FIG. 4 is a bottom view of an embodiment of the disclosure.
Figure 5A:
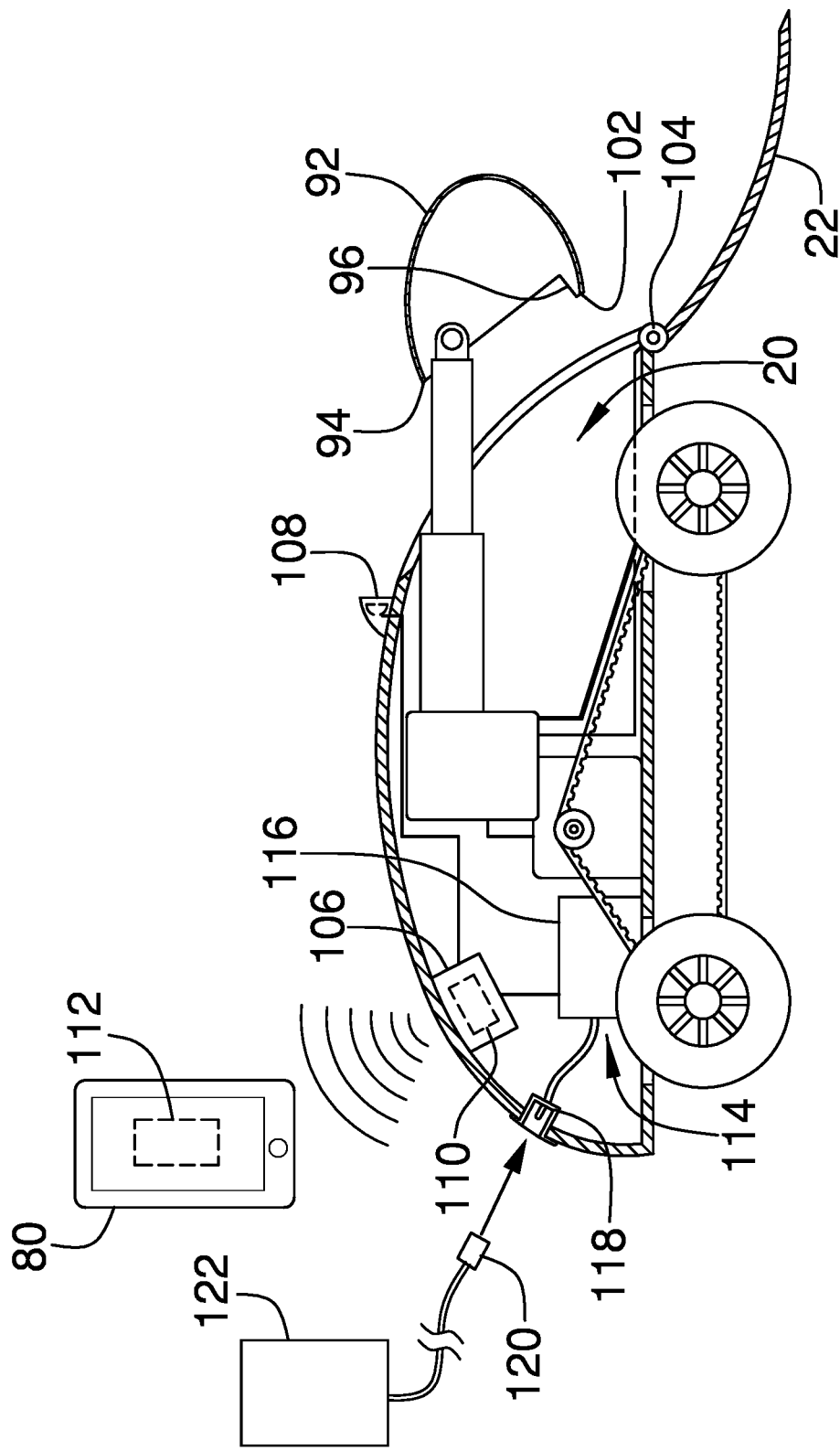
FIG. 5A is a cross sectional view taken along line 5A of FIG. 3 of an embodiment of the disclosure showing a collection unit in an extended condition.
Figure 5B:
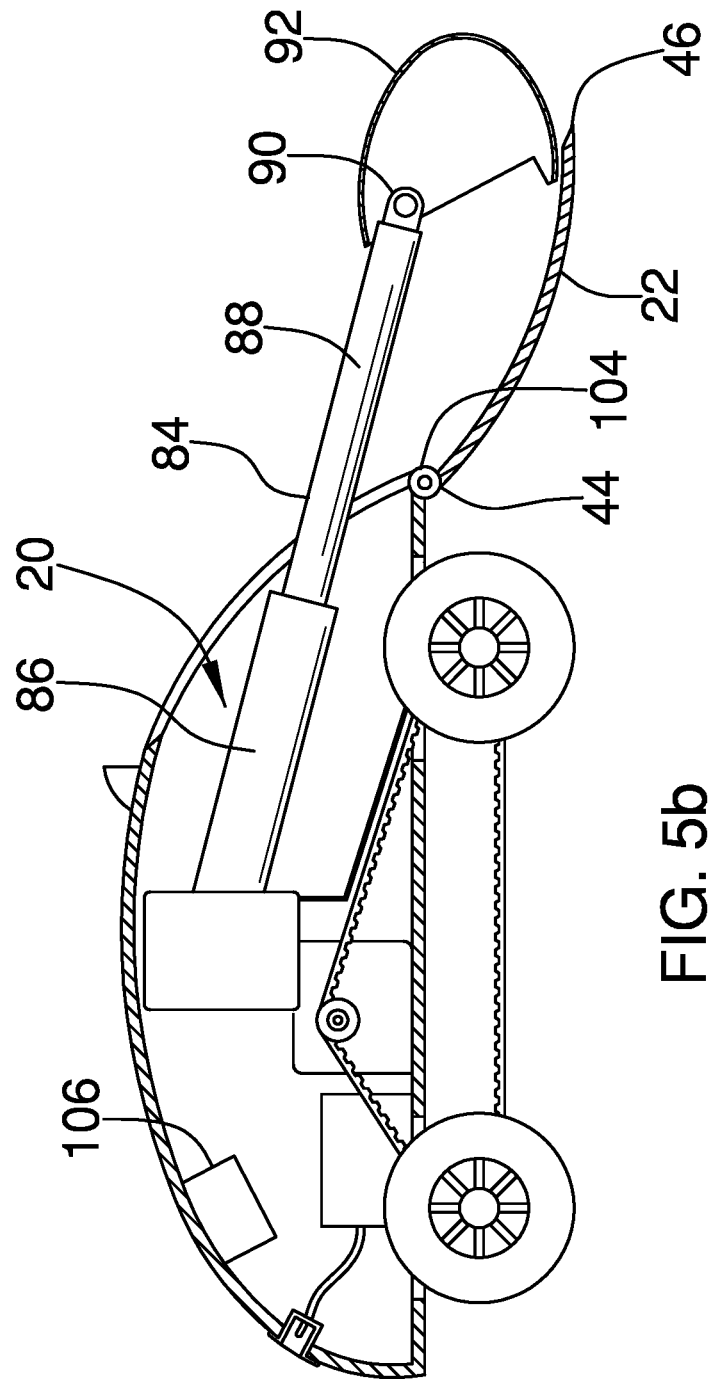
FIG. 5B is a cross sectional view taken along line 5B of FIG. 3 of an embodiment of the disclosure showing a collection unit in an angled condition.
Figure 5C:
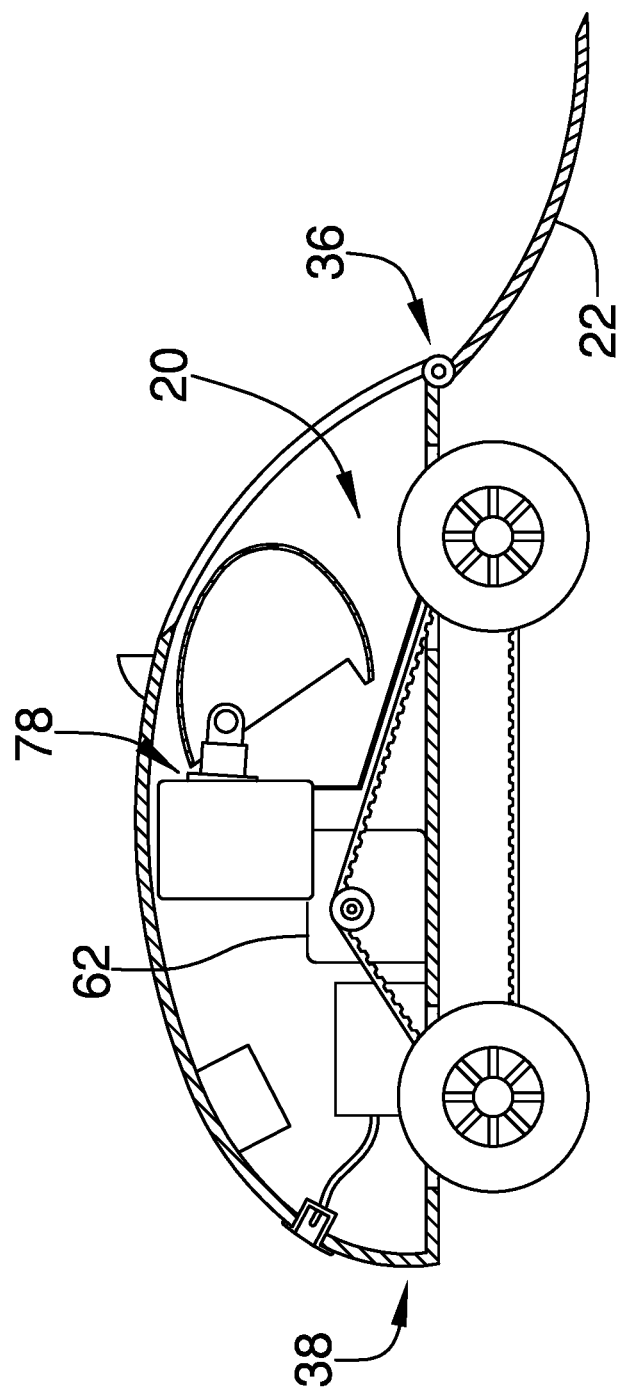
FIG. 5C is a cross sectional view taken along line 5C of FIG. 3 of an embodiment of the disclosure showing a collection unit in an retracted condition.
Figure 5D:
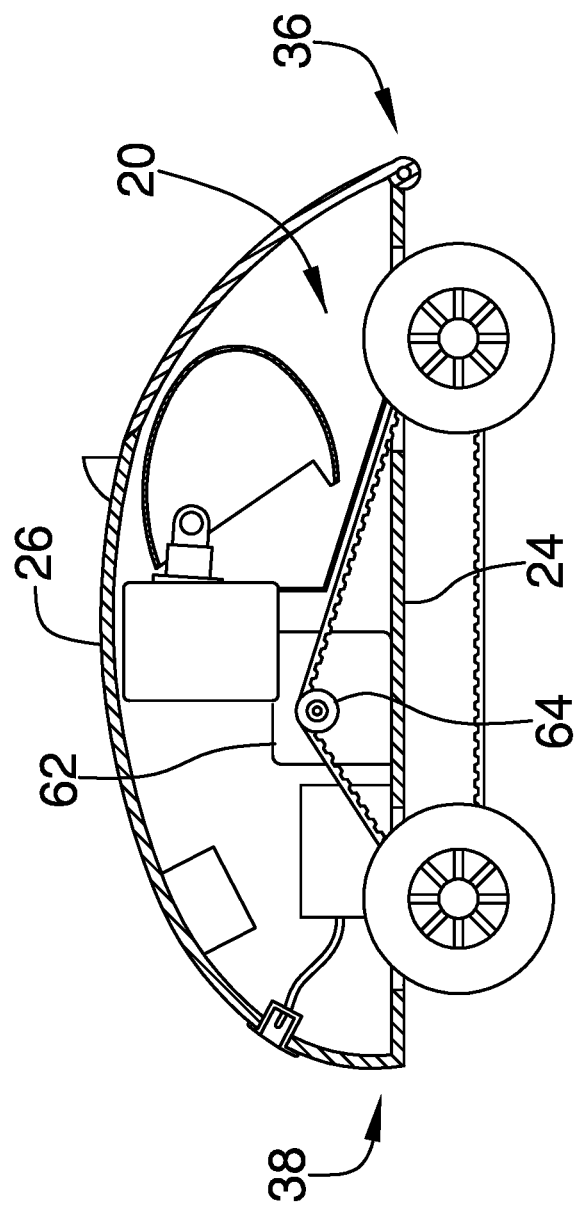
FIG. 5D is a cross sectional view taken along line 5D of FIG. 3 of an embodiment of the disclosure showing a ramp in a closed position.
Figure 6:
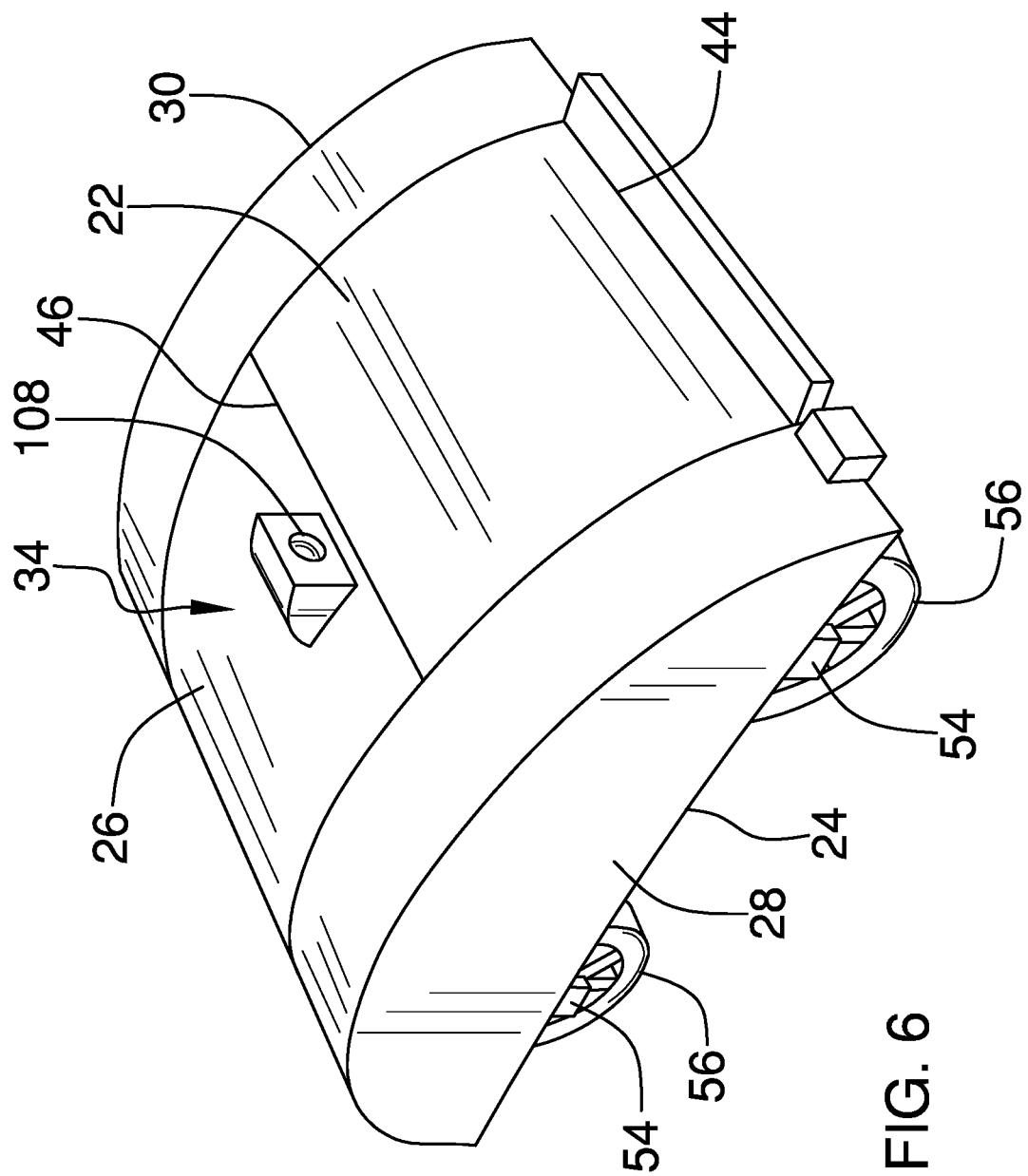
FIG. 6 is a top perspective view of an embodiment of the disclosure.
Figure 7:
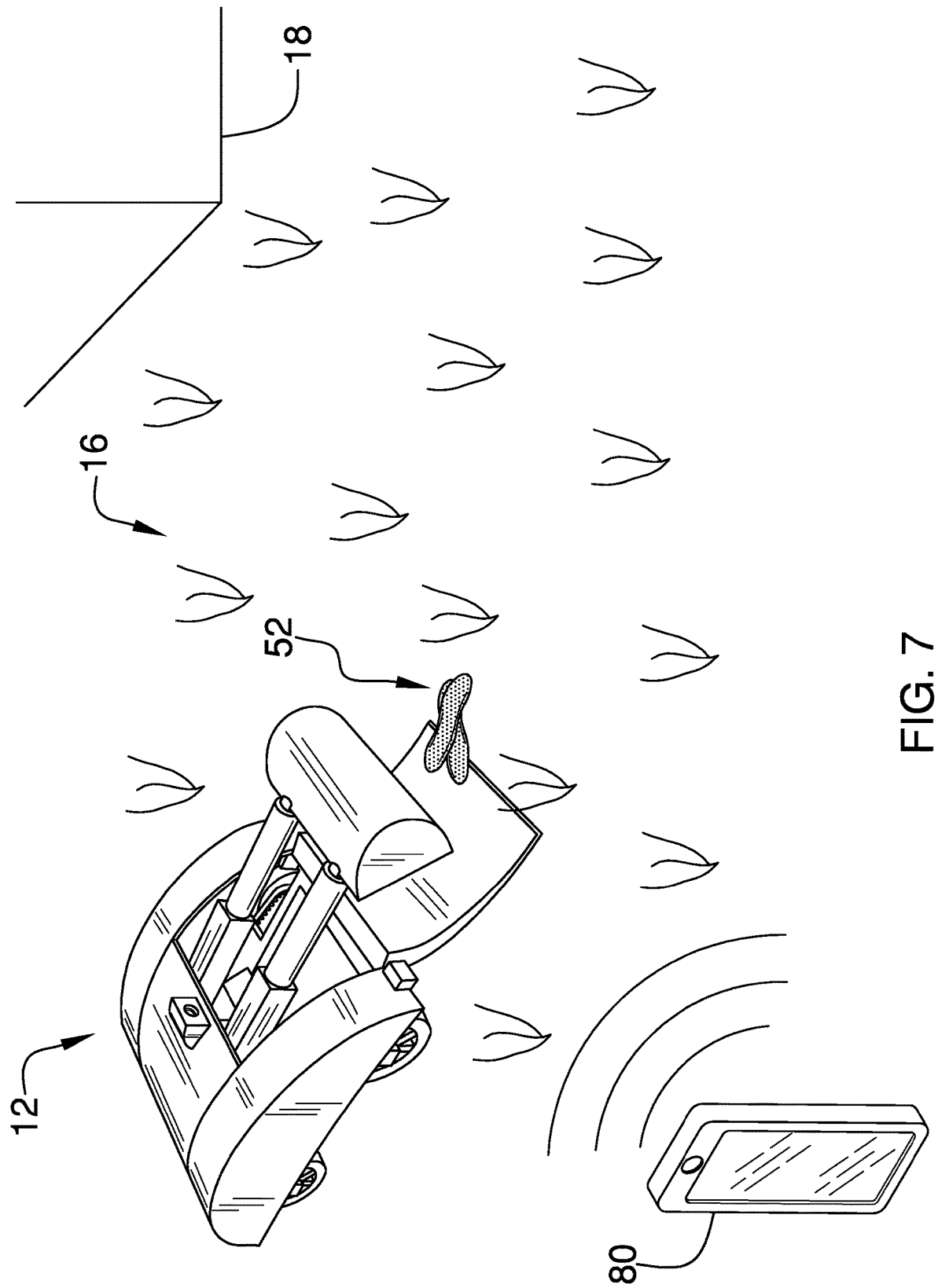
FIG. 7 is a perspective view of an embodiment of the disclosure.

With reference now to the drawings, and in particular to FIGS. 1 through 7 thereof, a new feces collection device embodying the principles and concepts of an embodiment of the disclosure and generally designated by the reference numeral 10 will be described.

As best illustrated in FIGS. 1 through 7, the animal feces collection assembly 10 generally comprises a cart 12 that has a drive unit 14 which is integrated into the cart 12 for driving the cart 12 along a yard 16 of a residence 18. The residence 18 may be a house, an apartment complex or any other type of occupancy in which a domesticated canine is kept as a pet. The cart 12 has a collection space 20 that is integrated into the cart 12 and the cart 12 has a ramp 22 that is positionable in an open position for exposing the collection space 20 and the ramp 22 is positionable in a closed position for closing the collection space 20. The ramp 22 is curved such that the ramp 22 curves downwardly onto the yard 16 when the ramp 22 is in the open position.

The cart 12 has a bottom wall 24 and a top wall 26 curving upwardly from the bottom wall 24 such that the cart 12 has a quonset shape. Additionally, the cart 12 has a first lateral wall 28 and a second lateral wall 30 each extending between the top wall 26 and the bottom wall 24. The top wall 26 has a collection opening 32 extending into the collection space 20 and the collection opening 32 extends from an intersection with the bottom wall 24 toward an apex 34 of the top wall 26. The collection space 20 extends from a front side 36 of the cart 12 toward a back side 38 of the cart 12. The collection opening 32 is positioned on the front side 36 of the cart 12, the collection opening 32 extends substantially between each of the first lateral wall 28 and the second lateral wall and the collection opening 32 is centrally positioned on the front side 36 of the cart 12.

The cart 12 has a plurality of drive openings 40 each extending through the bottom wall 24 and each of the drive openings 40 is positioned adjacent to a respective one of four corners 42 of the bottom wall 24. The ramp 22 has a lower edge 44 and an upper edge 46 and the ramp 22 is curved between the lower edge 44 and the upper edge 46. The lower edge 44 is pivotally attached to a lower side 48 of a bounding edge 50 of the collection opening 32. Additionally, the ramp 22 conforms to curvature of the top wall 26 when the ramp 22 is in the closed position. The ramp 22 curves downwardly toward the yard 16 such that the upper edge 46 abuts the yard 16 when the ramp 22 is in the closed position. In this way the ramp 22 facilitates animal feces 52 on the yard 16 to be slid upwardly along the ramp 22 and into the collection space 20. As is most clearly shown in FIG. 5C, the ramp 22 tapers to a point at the upper edge 46 of the ramp 22 to enhance the animal feces 52 to slide onto the ramp 22.

The drive unit 14 comprises a plurality of roller mounts 54 that is each coupled to and extends downwardly from the bottom wall 24 of the cart 12. Each of the roller mounts 54 is positioned adjacent to a respective one of the drive openings 40 in the bottom wall 24. The drive unit 14 includes a plurality of rollers 56 that is each rotatably coupled to a respective one of the roller mounts 54. Each of the rollers 56 has a rotational axis that is perpendicularly oriented with respect to the respective roller mount 54 thereby facilitating each of the rollers 56 to roll along the yard 16. The plurality of rollers 56 includes a set of first rollers 58 and a set of second rollers 60. Each of the first rollers 58 is positioned adjacent to the first lateral wall 28 of the cart 12 and each of the second rollers 60 is positioned adjacent to the second lateral wall 30 of the cart 12. Each of the rollers 56 may comprise a spoked wheel with a rubberized tire or other type of roller that can efficiently travel along uneven ground in the yard 16.

The drive unit 14 includes a pair of drive motors 62 that is each positioned within the cart 12 and each of the drive motors 62 is mounted to the bottom wall 24 of the cart 12. Each of the drive motors 62 rotates in either a first direction or a second direction when the drive motors 62 are turned on. Additionally, each of the drive motors 62 is independently actuatable with respect to each other. Each of the drive motors 62 has an output shaft 64 which has a rotational axis extending between the first lateral wall 28 and the second lateral wall 30 of the cart 12. The pair of drive motors 62 includes a first drive motor 66 and a second drive motor 68. The first drive motor 66 is positioned adjacent to the first lateral wall 28 of the cart 12 and the second drive motor 68 is positioned adjacent to the second lateral wall 30 of the cart 12.

The drive unit 14 includes a first drive belt 70 which extends around the output shaft 64 of the first drive motor 66 and an axle 72 of each of the first rollers 58. Thus, each of the first rollers 58 is rotated when the first drive motor 66 is turned on for driving the cart 12 along the yard 16. The drive unit 14 includes a second drive belt 74 which extends around the output shaft 64 of the second drive motor 68 and an axle 76 of each of the second rollers 60. Thus, each of the second rollers 60 is rotated when the second drive motor 68 is turned on for driving the cart 12 along the yard 16.

A collection unit 78 is movably integrated into the cart 12 and the collection unit 78 is actuatable between a retracted condition and an extended condition. The collection unit 78 is contained within the collection space 20 in the cart 12 when the collection unit 78 is in the retracted condition. Conversely, the collection unit 78 extends outwardly from the cart 12 when the collection unit 78 is in the extended condition. The collection unit 78 is actuatable into an angled condition subsequent to the collection unit 78 being in the extended condition having the collection unit 78 resting on the ramp 22 when the ramp 22 is in the open position. In this way the collection unit 78 can engage the animal feces 52 on the ramp 22. Furthermore, the collection unit 78 is actuated into the retracted condition subsequent to the collection unit 78 being actuated into the angled condition. In this way the collection unit 78 can urge the animal feces 52 upwardly along the ramp 22 and into the collection space 20. The collection unit 78 is in wireless communication with a personal electronic device 80 thereby facilitating the communication unit to receive operational commands from the personal electronic device 80.

The collection unit 78 comprises a collection servo 82 that is positioned within the cart 12. The collection unit 78 includes a pair of actuators 84 and each of the actuators 84 is coupled to and extends forwardly from the collection servo 82. Each of the actuators 84 comprises a first tube 86 that slidably engages a second tube 88 such that each of the actuators 84 has a telescopically adjustable length. Each of the actuators 84 has a distal end 90 with respect to the collection servo 82 and the distal end 90 of each of the actuators 84 extends outwardly through the collection opening 32 when the actuators 84 are actuated into an extended condition. The distal end 90 of each of the actuators 84 is retracted into the collection space 20 when the actuators 84 are actuated into a retracted condition. Each of the actuators 84 may comprise a linear actuator or other type of electromechanical actuator that can either lengthen or shorten.

The collection servo 82 is actuated into a first condition when the actuators 84 are actuated into the extended condition such that each of the actuators 84 angles downwardly toward the ramp 22. Conversely, the collection servo 82 is actuated into a second condition when the actuators 84 are actuated into the retracted condition such that each of the actuators 84 is horizontally oriented. The collection servo 82 may comprise an electro-mechanical actuator or the like that can pivot upwardly and downwardly.

A bucket 92 is provided which is concavely arcuate between an upper edge 94 and a lower edge 96 of the bucket 92 thereby defining an opening into the bucket 92 which extends between the upper edge 94 and the lower edge 96. The bucket 92 is oriented such that the opening faces the cart 12 and the distal end 90 of each of the actuators 84 is coupled to the upper edge 64. The bucket 92 has a lip 102 extending away from the lower edge 96 of the bucket 92 such that the lip 102 is directed toward the cart 12. Furthermore, the lip 102 engages the ramp 22 when the actuators 84 are actuated into the extended condition and the collection servo 82 is actuated into the first condition. The bucket 92 travels upwardly along the ramp 22 when the actuators 84 are actuated into the retracted condition and the collection servo 82 is actuated into the second condition. In this way the bucket 92 urges the animal feces 52 upwardly along the ramp 22 and into the collection space 20.

The collection unit 78 includes a ramp motor 104 that is integrated into the cart 12 and the ramp motor 104 is in mechanical communication with the lower edge 44 of the ramp 22. The ramp motor 104 urges the ramp 22 into the open position when the ramp motor 104 is turned on to rotate in a first direction. Conversely, the ramp motor 104 urges the ramp 22 into the closed position when the ramp motor 104 is turned on to rotate in a second direction. The ramp motor 104 may be a two direction electric motor or the like.

A control circuit 106 is integrated into the cart 12 and the control circuit 106 is electrically coupled to each of the drive motors 62, the collection servo 82, each of the actuators 84, and the ramp motor 104. The control circuit 106 receives a collection input and the ramp motor 104 is turned on to rotate in the first direction when the control circuit 106 receives the collection input. Each of the actuators 84 is actuated into the extended condition when the control circuit 106 receives the collection input and the collection servo 82 is actuated into the first condition when the control circuit 106 receives the collection input. The control circuit 106 performs a collection subroutine subsequent to the control circuit 106 receiving the collection input. Each of the actuators 84 is actuated into the retracting condition and the collection servo 82 is actuated into the second condition when the control circuit 106 performs the collection subroutine. The ramp motor 104 is actuated to rotate in the second direction subsequent to the actuators 84 is actuated into the retracting condition.

A camera 108 is coupled to the cart 12 thereby facilitating the camera 108 to capture footage of the yard 16 such that the camera 108 can view the animal feces 52. The drive unit 14 is actuated to drive the cart 12 toward the animal feces 52 and the collection unit 78 is actuated into the extended condition when the cart 12 approaches the animal feces 52. In this way the cart 12 and the collection unit 78 can automatically collect the animal feces 52 from the yard 16. The camera 108 is mounted to the top wall 26 of the cart 12 and the camera 108 is oriented to face toward the front end of the cart 12.

The camera 108 is electrically coupled to the control circuit 106 and the control circuit 106 analyzes the footage of the yard 16 captured by the camera 108. The control circuit 106 receives the collection input when the control circuit 106 determines that animal feces 52 have been detected by the camera 108. Additionally, the control circuit 106 actuates each of the drive motors 62 to drive the cart 12 toward the animal feces 52 when the control circuit 106 determines that the animal feces 52 have been detected by the camera 108. The camera 108 may comprise a digital video camera 108 or the like and the control circuit 106 includes an electronic memory which stores image analysis software for identifying the animal feces 52 in the footage captured by the camera 108.

A transceiver 110 is integrated into the cart 12, the transceiver 110 is electrically coupled to the control circuit 106 and the transceiver 110 is in wireless communication with the personal electronic device 80. The personal electronic device 80 stores a control application 112 thereby facilitating the control application 112 to facilitate the control circuit 106 to be remotely programmed by the control application 112. The transceiver 110 may comprise a radio frequency transceiver or the like and the transceiver 110 may employ Bluetooth communication protocols. Furthermore, the personal electronic device 80 may comprise a smart phone or other type of electronic device with wireless communication capabilities.

A power supply 114 is integrated into the cart 12 and the power supply 114 is electrically coupled to the control circuit 106. The power supply 114 comprises a rechargeable battery 116 that is integrated into the cart 12 and the rechargeable battery 116 is electrically coupled to the control circuit 106. The power supply 114 includes a charge port 118 that is recessed into the top wall 26 of the cart 12 thereby facilitating the charge port 118 to insertably receive a charge cord 120 of a charger 122. The charge port 118 is electrically coupled to the rechargeable battery 116 for charging the rechargeable battery 116.

The control application 112 facilitates a user of the cart 12 to create a personalized login which can store registration information of the cart 12 and other information that is specific to the user. The control application 112 displays a variety of operational parameters of the cart 12 in a graphical user interface. The operational parameters may include, but not be limited to, the remaining charge of the rechargeable battery 116, the storage capacity of the collection space 20, the number of hours the cart 12 has been in operation, a scheduling timer, an on button and an off button. In this way the control application 112 facilitates the cart 12 to be remotely controlled with the personal electronic device 80. Furthermore, the perimeter of the yard 16 in which the cart 12 will be employed, along with any obstacles in the yard 16 that the cart 12 should avoid, can be downloaded from the control application 112 into the control circuit 106 thereby facilitating the cart 12 to effectively navigate the yard 16 without leaving the yard 16 and without becoming impeded on the obstacles in the yard 16. Additionally, the control application 112 facilitates navigation information to be downloaded into the control circuit 106 to inhibit the cart 12 from repeatedly roaming the same area of the yard 16 while ignoring other areas of the yard 16.

In use, the cart 12 is placed in the yard 16 and the cart 12 is actuated with the control application 112 on the personal electronic device 80. In this way the cart 12 can navigate the yard 16 while the control circuit 106 analyzes the footage captured by the camera 108. The cart 12 drives toward animal feces 52 that are identified and the collection unit 78 collects the animal feces 52. In this way animal feces 52 in the yard 16 can be automatically collected into the cart 12 to facilitate the animal feces 52 to be emptied from the cart 12 at a later time for disposal. The cart 12 roams the entirety of the yard 16 and returns to a home position once all of the animal feces 52 in the yard 16 have been collected. Furthermore, the control application 112 is employed to customize operational parameters of the cart 12 to suit the user's desires and to remotely control the cart 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. An animal feces collection assembly for automatically roaming a yard and collecting animal feces, said assembly comprising:
   a cart having a drive unit being integrated into said cart for driving said cart along a yard of a residence, said cart having a collection space being integrated into said cart, said cart having a ramp being positionable in an open position for exposing said collection space, said ramp being curved such that said ramp curves downwardly onto the yard when said ramp is in said open position, said ramp being positionable in a closed position for closing said collection space;
   a collection unit being movably integrated into said cart, said collection unit being actuatable between a retracted condition and an extended condition, said collection unit being contained within said collection space in said cart when said collection unit is in said retracted condition, said collection unit extending outwardly from said cart when said collection unit is in said extended condition, said collection unit being actuatable into an angled condition subsequent to said collection unit being in said extended condition having said collection unit resting on said ramp when said ramp is in said open position wherein said collection unit is configured to engage the animal feces on said ramp, said collection unit being actuated into said retracted condition subsequent to said collection unit being actuated into said angled condition wherein said collection unit is configured to urge the animal feces upwardly along said ramp and into said collection space, said collection unit being in wireless communication with a personal electronic device thereby facilitating said communication unit to receive operational commands from said personal electronic device; and
   a camera being coupled to said cart thereby facilitating said camera to capture footage of the yard wherein said camera is configured to view the animal feces, said drive unit being actuated to drive said cart toward the animal feces, said collection unit being actuated into said extended condition when said cart approaches the animal feces wherein said cart and said collection unit are configured to automatically collect the animal feces from the yard.

2. The assembly according to claim 1, wherein:
   said cart has a bottom wall and a top wall curving upwardly from said bottom wall such that said cart has a quonset shape, said cart having a first lateral wall and a second lateral wall each extending between said top wall and said bottom wall;
   said top wall has a collection opening extending into said collection space, said collection opening extending from an intersection with said bottom wall toward an apex of said top wall, said collection space extending from a front side of said cart toward a back side of said cart, said collection opening being positioned on a front side of said cart, said collection opening extending substantially between each of said first lateral wall and said second lateral wall, said collection opening being centrally positioned on said front side of said cart;
   said cart has a plurality of drive openings each extending through said bottom wall, each of said drive openings being positioned adjacent to a respective one of four corners of said bottom wall; and
   said ramp has a lower edge and an upper edge, said ramp being curved between said lower edge and said upper edge, said lower edge being pivotally attached to a lower side of a bounding edge of said collection opening, said ramp conforming to curvature of said top wall when said ramp is in said closed position, said ramp curving downwardly toward the yard having said upper edge abutting the yard when said ramp is in said closed position wherein said ramp is configured to facilitate animal feces on the yard to be slid upwardly along said ramp and into said collection space.

3. The assembly according to claim 2, wherein said drive unit comprises:
   a plurality of roller mounts, each of said roller mounts being coupled to and extending downwardly from said bottom wall of said cart, each of said roller mounts being positioned adjacent to a respective one of said drive openings in said bottom wall;
   a plurality of rollers, each of said rollers being rotatably coupled to a respective one of said roller mounts, each of said rollers having a rotational axis being perpendicularly oriented with respect to said respective roller mount thereby facilitating each of said rollers to roll along the yard, said plurality of rollers including a set of first rollers and a set of second rollers, each of said first rollers being positioned adjacent to said first lateral wall of said cart, each of said second rollers being positioned adjacent to said second lateral wall of said cart;
   a pair of drive motors, each of said drive motors being positioned within said cart, each of said drive motors being mounted to said bottom wall of said cart, each of said drive motors rotating in either a first direction or a second direction when said drive motors are turned on, each of said drive motors being independently actuatable with respect to each other, each of said drive motors having an output shaft having a rotational axis extending between said first lateral wall and said second lateral wall of said cart, said pair of drive motors including a first drive motor and a second drive motor, said first drive motor being positioned adjacent to said first lateral wall of said cart, said second drive motor being positioned adjacent to said second lateral wall of said cart;
   a first drive belt extending around said output shaft of said first drive motor and an axle of each of said first rollers such that each of said first rollers is rotated when said first motor is turned on for driving said cart along the yard; and a second drive belt extending around said output shaft of said second drive motor and an axle of each of said second rollers such that each of said second rollers is rotated when said second motor is turned on for driving said cart along the yard.

4. The assembly according to claim 2, wherein said collection unit comprises:

a collection servo being positioned within said cart;

a pair of actuators, each of said actuators being coupled to and extending forwardly from said collection servo, each of said actuators comprising a first tube slidably engaging a second tube such that each of said actuators has a telescopically adjustable length, each of said actuators having a distal end with respect to said collection servo, said distal end of each of said actuators extending outwardly through said collection opening when said actuators are actuated into an extended condition, said distal end of each of said actuators being retracted into said collection space when said actuators are actuated into a retracted condition, said collection servo being actuated into a first condition when said actuators are actuated into said extended condition such that each of said actuators angles downwardly toward said ramp, said collection servo being actuated into a second condition when said actuators are actuated into said retracted condition such that each of said actuators is horizontally oriented; and a ramp motor being integrated into said cart, said ramp motor being in mechanical communication with said lower edge of said ramp, said ramp motor urging said ramp into said open position when said ramp motor is turned on to rotate in a first direction, said ramp motor urging said ramp into said closed position when said ramp motor is turned on to rotate in a second direction.

5. The assembly according to claim 4, wherein said collection unit includes a bucket being concavely arcuate between an upper edge and a lower edge of said bucket thereby defining an opening into said bucket which extends between said upper edge and said lower edge, said bucket being oriented such that said opening faces said cart, said distal end of each of said actuators being coupled to said upper edge of said bucket.

6. The assembly according to claim 5, wherein said bucket has a lip extending away from said lower edge such that said lip is directed toward said cart, said lip engaging said ramp when said actuators are actuated into said extended condition and said collection servo is actuated into said first condition, said bucket travelling upwardly along said ramp when said actuators are actuated into said retracted condition and said collection servo is actuated into said second condition wherein said bucket is configured to urge the animal feces upwardly along said ramp and into said collection space.

7. The assembly according to claim 4, wherein:

said assembly includes a control circuit being integrated into said cart, said control circuit being electrically coupled to each of said drive motors and said collection servo and each of said actuators and said ramp motor, said control circuit receiving a collection input;

said ramp motor is turned on to rotate in said first direction when said control circuit receives said collection input;

each of said actuators is actuated into said extended condition when said control circuit receives said collection input; and said collection servo is actuated into said first condition when said control circuit receives said collection input.

8. The assembly according to claim 7, wherein:

said control circuit performs a collection subroutine subsequent to said control circuit receiving said collection input, each of said actuators being actuated into said retracting condition and said collection servo being actuated into said second condition when said control circuit performs said collection subroutine; and said ramp motor is actuated to rotate in said second direction subsequent to said actuators being actuated into said retracting condition.

9. The assembly according to claim 7, wherein said camera is mounted to said top wall of said cart, said camera being oriented to face toward said front end of said cart, said camera being electrically coupled to said control circuit, said control circuit analyzing the footage of the yard captured by said camera, said control circuit receiving said collection input when said control circuit determines that animal feces has been detected by said camera, said control circuit actuating each of said drive motors to drive said cart toward the animal feces when said control circuit determines that the animal feces has been detected by said camera.

10. The assembly according to claim 7, further comprising a transceiver being integrated into said cart, said transceiver being electrically coupled to said control circuit, said transceiver being in wireless communication with said personal electronic device, said personal electronic device storing a control application thereby facilitating said control application to facilitate said control circuit to be remotely programmed by said control application.

11. The assembly according to claim 7, further comprising a power supply being integrated into said cart, said power supply being electrically coupled to said control circuit, said power supply comprising:

a rechargeable battery being integrated into said cart, said rechargeable battery being electrically coupled to said control circuit; and a charge port being recessed into said top wall of said cart thereby facilitating said charge port to insertably receive a charge cord of a charger, said charge port being electrically coupled to said rechargeable battery for charging said rechargeable battery.

12. An animal feces collection assembly for automatically roaming a yard and collecting animal feces, said assembly comprising:

a cart having a drive unit being integrated into said cart for driving said cart along a yard of a residence, said cart having a collection space being integrated into said cart, said cart having a ramp being positionable in an open position for exposing said collection space, said ramp being curved such that said ramp curves downwardly onto the yard when said ramp is in said open position, said ramp being positionable in a closed position for closing said collection space, said cart having a bottom wall and a top wall curving upwardly from said bottom wall such that said cart has a quonset shape, said cart having a first lateral wall and a second lateral wall each extending between said top wall and said bottom wall, said top wall having a collection opening extending into said collection space, said collection opening extending from an intersection with said bottom wall toward an apex of said top wall, said collection space extending from a front side of said cart toward a back side of said cart, said collection opening being positioned on a front side of said cart, said collection opening extending substantially between each of said first lateral wall and said second lateral wall, said collection opening being centrally positioned on said front side of said cart, said cart having a plurality of drive openings each extending through said bottom wall, each of said drive openings being positioned adjacent to a respective one of four corners of said bottom wall, said ramp having a lower edge and an upper edge, said ramp being curved between said lower edge and said upper edge, said lower edge being pivotally attached to a lower side of a bounding edge of said collection opening, said ramp conforming to curvature of said top wall when said ramp is in said closed position, said ramp curving downwardly toward the yard having said upper edge abutting the yard when said ramp is in said closed position wherein said ramp is configured to facilitate animal feces on the yard to be slid upwardly along said ramp and into said collection space, said drive unit comprising:

a plurality of roller mounts, each of said roller mounts being coupled to and extending downwardly from said bottom wall of said cart, each of said roller mounts being positioned adjacent to a respective one of said drive openings in said bottom wall;

a plurality of rollers, each of said rollers being rotatably coupled to a respective one of said roller mounts, each of said rollers having a rotational axis being perpendicularly oriented with respect to said respective roller mount thereby facilitating each of said rollers to roll along the yard, said plurality of rollers including a set of first rollers and a set of second rollers, each of said first rollers being positioned adjacent to said first lateral wall of said cart, each of said second rollers being positioned adjacent to said second lateral wall of said cart;

a pair of drive motors, each of said drive motors being positioned within said cart, each of said drive motors being mounted to said bottom wall of said cart, each of said drive motors rotating in either a first direction or a second direction when said drive motors are turned on, each of said drive motors being independently actuatable with respect to each other, each of said drive motors having an output shaft having a rotational axis extending between said first lateral wall and said second lateral wall of said cart, said pair of drive motors including a first drive motor and a second drive motor, said first drive motor being positioned adjacent to said first lateral wall of said cart, said second drive motor being positioned adjacent to said second lateral wall of said cart;

a first drive belt extending around said output shaft of said first drive motor and an axle of each of said first rollers such that each of said first rollers is rotated when said first motor is turned on for driving said cart along the yard; and a second drive belt extending around said output shaft of said second drive motor and an axle of each of said second rollers such that each of said second rollers is rotated when said second motor is turned on for driving said cart along the yard;

a collection unit being movably integrated into said cart, said collection unit being actuatable between a retracted condition and an extended condition, said collection unit being contained within said collection space in said cart when said collection unit is in said retracted condition, said collection unit extending outwardly from said cart when said collection unit is in said extended condition, said collection unit being actuatable into an angled condition subsequent to said collection unit being in said extended condition having said collection unit resting on said ramp when said ramp is in said open position wherein said collection unit is configured to engage the animal feces on said ramp, said collection unit being actuated into said retracted condition subsequent to said collection unit being actuated into said angled condition wherein said collection unit is configured to urge the animal feces upwardly along said ramp and into said collection space, said collection unit being in wireless communication with a personal electronic device thereby facilitating said communication unit to receive operational commands from said personal electronic device, said collection unit comprising:

a collection servo being positioned within said cart;

a pair of actuators, each of said actuators being coupled to and extending forwardly from said collection servo, each of said actuators comprising a first tube slidably engaging a second tube such that each of said actuators has a telescopically adjustable length, each of said actuators having a distal end with respect to said collection servo, said distal end of each of said actuators extending outwardly through said collection opening when said actuators are actuated into an extended condition, said distal end of each of said actuators being retracted into said collection space when said actuators are actuated into a retracted condition, said collection servo being actuated into a first condition when said actuators are actuated into said extended condition such that each of said actuators angles downwardly toward said ramp, said collection servo being actuated into a second condition when said actuators are actuated into said retracted condition such that each of said actuators is horizontally oriented;

a bucket being concavely arcuate between an upper edge and a lower edge of said bucket thereby defining an opening into said bucket which extends between said upper edge and said lower edge, said bucket being oriented such that said opening faces said cart, said distal end of each of said actuators being coupled to said upper edge of said bucket, said bucket having a lip extending away from said lower edge such that said lip is directed toward said cart, said lip engaging said ramp when said actuators are actuated into said extended condition and said collection servo is actuated into said first condition, said bucket travelling upwardly along said ramp when said actuators are actuated into said retracted condition and said collection servo is actuated into said second condition wherein said bucket is configured to urge the animal feces upwardly along said ramp and into said collection space; and a ramp motor being integrated into said cart, said ramp motor being in mechanical communication with said lower edge of said ramp, said ramp motor urging said ramp into said open position when said ramp motor is turned on to rotate in a first direction, said ramp motor urging said ramp into said closed position when said ramp motor is turned on to rotate in a second direction;

a control circuit being integrated into said cart, said control circuit being electrically coupled to each of said drive motors and said collection servo and each of said actuators and said ramp motor, said control circuit receiving a collection input, said ramp motor being turned on to rotate in said first direction when said control circuit receives said collection input, each of said actuators being actuated into said extended condition when said control circuit receives said collection input, said collection servo being actuated into said first condition when said control circuit receives said collection input, said control circuit performing a collection subroutine subsequent to said control circuit receiving said collection input, each of said actuators being actuated into said retracting condition and said collection servo being actuated into said second condition when said control circuit performs said collection subroutine, said ramp motor being actuated to rotate in said second direction subsequent to said actuators being actuated into said retracting condition;

a camera being coupled to said cart thereby facilitating said camera to capture footage of the yard wherein said camera is configured to view the animal feces, said drive unit being actuated to drive said cart toward the animal feces, said collection unit being actuated into said extended condition when said cart approaches the animal feces wherein said cart and said collection unit are configured to automatically collect the animal feces from the yard, said camera being mounted to said top wall of said cart, said camera being oriented to face toward said front end of said cart, said camera being electrically coupled to said control circuit, said control circuit analyzing the footage of the yard captured by said camera, said control circuit receiving said collection input when said control circuit determines that animal feces has been detected by said camera, said control circuit actuating each of said drive motors to drive said cart toward the animal feces when said control circuit determines that the animal feces has been detected by said camera;

a transceiver being integrated into said cart, said transceiver being electrically coupled to said control circuit, said transceiver being in wireless communication with said personal electronic device, said personal electronic device storing a control application thereby facilitating said control application to facilitate said control circuit to be remotely programmed by said control application; and a power supply being integrated into said cart, said power supply being electrically coupled to said control circuit, said power supply comprising:
  a rechargeable battery being integrated into said cart, said rechargeable battery being electrically coupled to said control circuit; and
  a charge port being recessed into said top wall of said cart thereby facilitating said charge port to insertably receive a charge cord of a charger, said charge port being electrically coupled to said rechargeable battery for charging said rechargeable battery.

* * * * *